United States Patent
Haartsen

(10) Patent No.: US 8,660,535 B2
(45) Date of Patent: *Feb. 25, 2014

(54) ELECTRONIC DEVICES THAT COMMUNICATE VIA MAGNETICALLY COUPLED AND RF COUPLED COMMUNICATION CIRCUITS

(71) Applicant: Sony Ericsson Mobile Communications AB, Lund (SE)

(72) Inventor: Jacobus Cornelis Haartsen, Hardenberg (NL)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/654,688

(22) Filed: Oct. 18, 2012

(65) Prior Publication Data

US 2013/0044793 A1    Feb. 21, 2013

Related U.S. Application Data

(63) Continuation of application No. 13/356,126, filed on Jan. 23, 2012, now Pat. No. 8,320,885, which is a continuation of application No. 12/210,550, filed on Sep. 15, 2008, now Pat. No. 8,126,433.

(51) Int. Cl.
*H04M 1/66* (2006.01)
*H04M 1/68* (2006.01)
*H04M 3/16* (2006.01)

(52) U.S. Cl.
USPC ............... 455/411; 455/550.1; 455/556.1

(58) Field of Classification Search
USPC ............... 455/41.1–41.3, 411, 550.1, 556.1
See application file for complete search history.

(56) References Cited

U.S. PATENT DOCUMENTS 7,643,798 B2 *    1/2010    Ljung ................... 455/41.3

FOREIGN PATENT DOCUMENTS

WO    WO 2007/066175 A1    6/2007

OTHER PUBLICATIONS

Anonymous, "Near Field Communication White Paper" Internet Citation. Retrieved from the Internet: URL:http://www.ecmainternational.org/activities/Communications/2004tgt9-001.pdf [retrieved on Mar. 6, 2006].*

Anonymous, "Near Field Communication White Paper", Internet Citation, [Online] XP002370657, Retrieved from the Internet: URL:http://ww.ecma.international.org/activities/Communications/2004tg19-001.pdf, retrieved on Mar. 6, 2006.

(Continued)

*Primary Examiner* — Tuan H Nguyen
(74) *Attorney, Agent, or Firm* — Myers Bigel Sibley & Sajovec, P.A.

(57) ABSTRACT

An electronic communication device includes a RF wireless transmitter circuit that transmits a block of data to another communication device via RF signals transmitted at a first rate. A magnetically coupled receiver circuit receives a communication control signal from the other communication device via magnetic coupling thereto at a second rate which is less than the first rate, and is configured to respond to the communication control signal by selectively triggering the RF wireless transmitter circuit to transmit another block of data when available for transmission. An inductive charging circuit converts magnetic signals received from the other communication device into power, and supplies the power to the RF wireless transmitter circuit. The RF wireless transmitter circuit transmits data blocks in RF bursts.

16 Claims, 5 Drawing Sheets

(56) References Cited

OTHER PUBLICATIONS

Information technology—Telecommunications and Information exchange between systems—Near Field Communication—Interface and Protocol (NFCIP-1), International Standard ISO/IEC, vol. 18092, Apr. 1, 2004, XP007905654.

"Near Field Communication Interface and Protocol—(NFCIP-2)", Standard ECMA, vol. ECMA-352, Dec. 1, 2003, XP007900607.

Notification of Transmittal of the International Search Report and the Written Opinion of the International Searching Authority, or the Declaration; International Search Report; Written Opinion of the International Searching Authority, PCT/IB2009/051072, Jun. 23, 2009.

Written Opinion of the International Preliminary Examining Authority, PCT/IB2009/051072, Aug. 12, 2010.

* cited by examiner

US 8,660,535 B2

ELECTRONIC DEVICES THAT COMMUNICATE VIA MAGNETICALLY COUPLED AND RF COUPLED COMMUNICATION CIRCUITS

CROSS REFERENCE TO RELATED APPLICATIONS

This application is a continuation application that claims priority to U.S. patent application Ser. No. 13/356,126, filed on 23 Jan. 2012, which is a continuation application that claims priority to U.S. patent application Ser. No. 12/210,550, filed on 15 Sep. 2008.

BACKGROUND OF THE INVENTION

This invention relates to electronic wireless communication devices and, more particularly, to near field communication devices and operating methods therefor.

Near Field Communication or NFC, is a short-range high frequency wireless communication technology which enables the exchange of data between devices over about a 10 cm distance. The communication protocol and operation is an extension of the ISO 14443 proximity-card standard (contactless card, RFID) and is specified in the ECMA-340 and ISO/IEC 18092 technology standards. NFC is used in some devices to combine the interface of a smartcard and a reader into a single device. An NFC device may communicate with both existing ISO 14443 smartcards and readers, as well as with other NFC devices, and is thereby compatible with existing contactless communication infrastructure.

Like ISO 14443, NFC devices communicate via magnetic field induction. Loop antennas in the devices are placed in closed proximity to each other within the other's antenna near field, thereby effectively forming an air-core transformer. NFC devices typically transmit within the globally available and unlicensed radio frequency ISM band of 13.56 MHz, with a bandwidth of almost 2 MHz. NFC devices also typically support data rates of 106, 212, or 424 kbit/s using a modified Miller coding or Manchester coding to encode and decode communicated data.

NFC devices can be configured to operate in either a passive or an active communication mode. When operating in the passive communication mode, the initiator device provides a carrier field and the target device answers by modulating the carrier field. In this mode, the target device may generate its operating power from the initiator-provided electromagnetic field, thus making the target device a transponder. In contrast, when operating in the active communication mode, both the initiator device and the target device communicate by alternately generating their own RF fields when communicating, and by deactivating their own RF field while waiting for data from the other device. Accordingly, when operating in the active communication mode, both devices typically need to have their own power supply.

SUMMARY OF THE INVENTION

Some embodiments use a high speed high-rate RF wireless communication link, such as a TransferJet communication link, to communicate data from one communication device to another, and use a low-rate magnetically coupled communication link, such as a NFC communication link, to communicate control information in the opposite direction between the communication devices.

More specifically, some embodiments provide an electronic communication device that includes a high-rate RF wireless transmitter circuit and a low-rate magnetically coupled receiver circuit. The high-rate RF wireless transmitter circuit transmits a block of data to another proximately located communication device via RF signals using a first RF communication protocol. The low-rate magnetically coupled receiver circuit receives a communication control signal from the other proximately located communication device via magnetic coupling thereto using a second protocol that is different from the first RF communication protocol, and responds to the communication control signal by selectively triggering the high-rate RF wireless transmitter circuit to transmit another block of data when available for transmission.

In some further embodiments, the high-rate RF wireless transmitter circuit includes a TransferJet transmitter circuit, and the low-rate magnetically coupled receiver circuit includes a Near Field Communication (NFC) receiver circuit. The NFC receiver circuit may be the only circuit in the electronic communication device that is capable of receiving communication signals via magnetic coupling from the other proximately located communication device, and the TransferJet transmitter circuit may be the only circuit in the electronic communication device that is capable of transmitting RF communication signals directly to the other proximately located communication device.

The electronic communication device can include an inductive charging circuit that converts magnetic signals received from the other proximately located communication device into power, and that supplies the power to the high-rate RF wirelesstransmitter circuit. The high-rate RF wirelesstransmitter circuit may consume power at a greater rate when transmitting than what can be generated by the charging circuit from the magnetic signals. The high-rate RF wirelesstransmitter circuit may therefore be configured to transmit data blocks in RF bursts. The number of data bits in each block may vary in response to how much power is supplied by the charging circuit before falling below a threshold level needed to operate the high-rate RF wirelesstransmitter circuit.

The high-rate RF wirelesstransmitter circuit may be further configured to increase a time delay between transmission RF bursts in response to the communication control signal, which is received via magnetic coupling through the low-rate magnetically coupled, indicating that the previously transmitted block of data was not properly received by the other proximately located communication device. Increasing the time delay can cause the charging circuit to accumulate power over a longer time between burst transmissions.

The TransferJet transmitter circuit may be further configured to decrease a transfer rate of data bits in an upcoming transmission burst in response to the communication control signal, which is received via the NFC receiver circuit, indicating that the previously transmitted block of data was not properly received by the other proximately located communication device.

The high-rate RF wireless transmitter circuit may be further configured to retransmit at least a portion of a previously transmitted block of data in response to the communication control signal indicating that the previously transmitted block of data was not properly received by the other proximately located communication device, and to transmit a next block of data in response to the communication control signal indicating that the previously transmitted block of data was properly received by the other proximately located communication device.

Some other embodiments are directed to an electronic communication device includes a high-rate RF wireless receiver circuit, a communication controller, and a low-rate magnetically coupled transmitter circuit. The high-rate RF wireless receiver circuit is configured to receive a block of data from another proximately located communication device via RF signals using a first RF communication protocol. The communication controller is configured to verify the received data block and to generate a control signal that indicates the outcome of the verification. The low-rate magnetically coupled transmitter circuit is configured to transmit the communication control signal to the other proximately located communication device via magnetic coupling thereto using a second communication protocol that is different from the first RF communication protocol.

In some further embodiments, the high-rate RF wireless receiver circuit includes a TransferJet receiver circuit, and the low-rate magnetically coupled transmitter circuit includes a Near Field Communication (NFC) transmitter circuit. The low-rate magnetically coupled transmitter circuit may be the only circuit in the electronic communication device that is capable of transmitting RF communication signals through magnetic coupling to the other proximately located communication device, and the high-rate RF wireless receiver circuit may be the only circuit in the electronic communication device that is capable of receiving RF communication signals directly from the other proximately located communication device.

The communication controller may be further configured to control length of a delay time between receipt of the data block and transmission of the corresponding communication control signal to the other proximately located communication device in response to the outcome of the verification.

The communication controller may be further configured to respond to a failed verification outcome by further delaying an upcoming transmission of a data block from the other proximately located communication device. The communication controller can thereby allow an inductive charging circuit in the other proximately located communication device to accumulate more stored power from magnetic signals from the low-rate magnetically coupled transmitter circuit.

The communication controller may be further configured to determine a number of bit errors in the received data block and to control the delay time in response to the number of bit errors. The communication controller may respond to the outcome of the verification by transmitting via the low-rate magnetically coupled transmitter circuit a command that regulates a transfer rate of data bits in an upcoming transmission of a data block from the other proximately located communication device.

The communication controller may be further configured to determine a signal power level of the data block received by the high-rate RF wireless receiver circuit, and to transmit via the low-rate magnetically coupled transmitter circuit a command that regulates a transfer rate of data bits in an upcoming data block transmission from the other proximately located communication device in response to the signal power level.

The communication controller may be further configured to determine a signal power level of the data block received by the high-rate RF wireless receiver circuit, and to control the length of a delay time between receipt of the data block and transmission of the corresponding communication control signal to the other proximately located communication device in response to the outcome of the determined signal power level. The communication controller may thereby control an amount of power that is stored between high-rate RF wireless transmissions by an inductive charging circuit in the other proximately located communication device from magnetic signals transmitted by the low-rate magnetically coupled transmitter circuit.

Some other embodiments are directed to a method that includes transmitting a block of data from a first electronic communication device to a proximately located second electronic communication device through a high-rate RF wireless communication link. A communication control signal, which indicates an outcome of verification by the second communication device of the received data block, is transmitted from the second communication device to the first communication device through a low-rate magnetically coupled communication link. Transmission of another block of data, when available for transmission, from the first communication device to the second communication device is triggered in response to the communication control signal.

Other devices, methods, and/or computer program products according to other embodiments will be or become apparent to one with skill in the art upon review of the following drawings and detailed description. It is intended that all such additional devices, methods, and/or computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION

Figure 1:
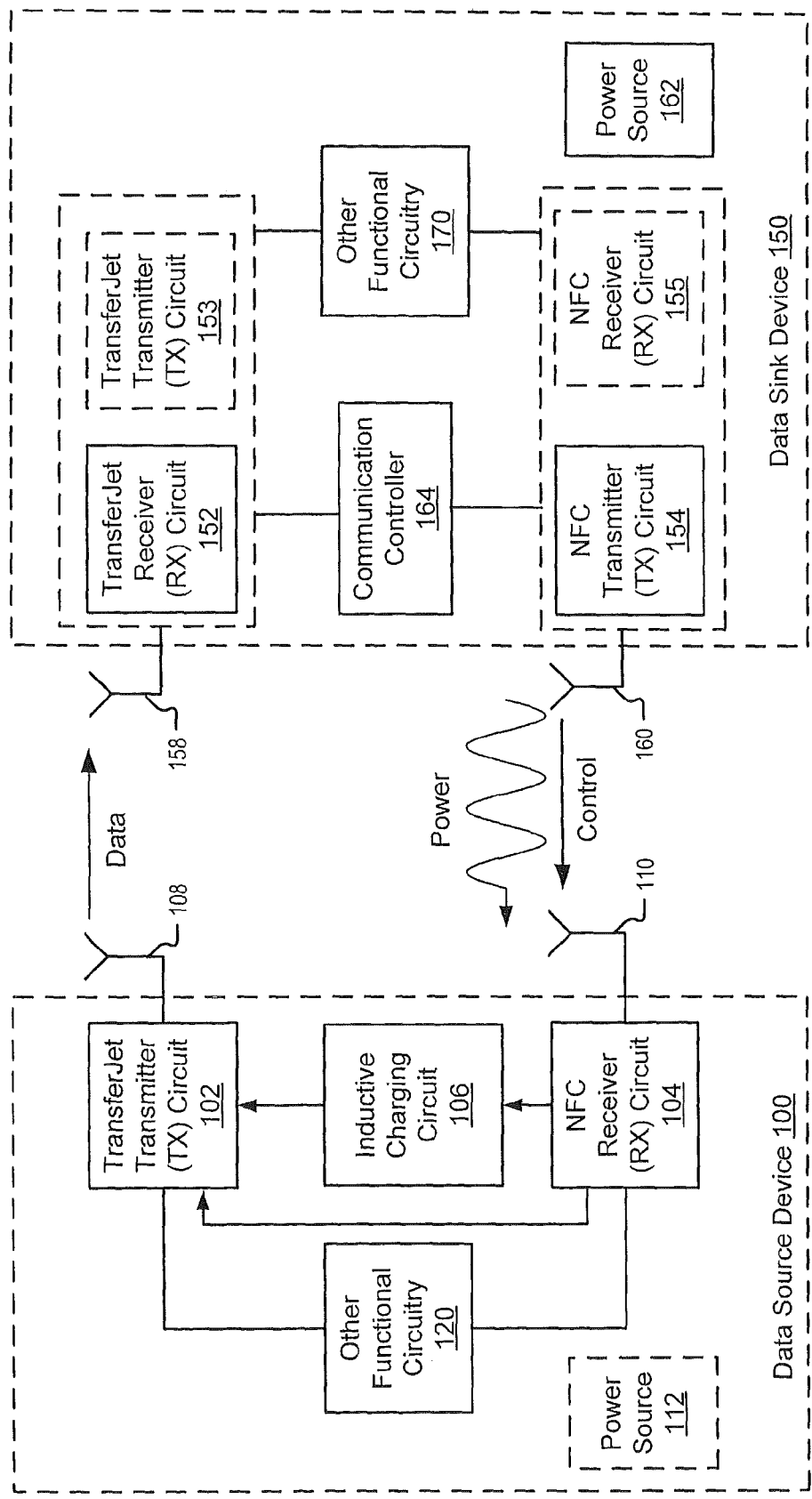
FIG. 1 is a block diagram of an exemplary pair of electronic wireless communication devices and methods of operating same, according to various embodiments.

The present invention now will be described more fully hereinafter with reference to the accompanying figures, in which embodiments are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" (and variants thereof) when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element/step (and variants thereof), it can be directly responsive to the other element/step, or intervening elements/steps may be present. In contrast, when an element/step is referred to as being "directly responsive" to another element/step (and variants thereof), there are no intervening elements/steps present. As used herein the term "and/or" includes any and all combinations of one or more of the associated listed items and may be abbreviated as "/".

It will be understood that, although the terms first, second, third, etc. may be used herein to describe various elements, these elements should not be limited by these terms. These terms are only used to distinguish one element from another.

The present invention is described below with reference to block diagrams and/or flowchart illustrations of methods, apparatus (systems and/or devices) and/or computer program products according to embodiments of the invention. It is understood that a block of the block diagrams and/or flowchart illustrations, and combinations of blocks in the block diagrams and/or flowchart illustrations, can be implemented by hardware and/or in software (including firmware, resident software, micro-code, etc.), referred to herein as "circuitry" or "circuit". For example, some of the functionality my be implemented in computer program instructions that may be provided to a processor of a general purpose computer, special purpose computer, digital signal processor and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a processor of the computer and/or other programmable data processing apparatus to function in a particular manner, such that the instructions stored in the computer-readable memory produce an article of manufacture including instructions which implement the function/act as specified in the block diagrams and/or flowchart block or blocks. The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

A computer-usable or computer-readable medium may be, for example but not limited to, an electronic, magnetic, optical, electromagnetic or semiconductor system, apparatus or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable optical and/or magnetic media, such as a flash disk or CD-ROM.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Various embodiments of the present invention are directed to an electronic wireless communication device that is configured to communicate using both TransferJet circuitry and NFC circuitry with another proximately located communication device. TransferJet is a close proximity wireless transfer technology that was originally developed by Sony Corporation to enable high-speed transfer of large data files between electronic devices, such as between mobile phones, digital cameras, digital video cameras/recorders, computers, data storage drives, and/or TVs. Using TransferJet technology, data can be transmitted at speeds of up to, for example, 560 Mbps or, with an error correction protocol overhead, at an effective transmission rate of 375 Mbps. TransferJET uses a Ultra-Wideband (UWB communication technology. TransferJet circuitry of one communication device can radiate very low-intensity radio waves to communicate with another communication device at close proximity. The TransferJet circuitry may communicate using, for example, a central frequency of 4.48 GHz and have a communication range of up to about 3 cm. Although these exemplary performance characteristics are provided for completeness, it is to be understood that the invention is not limited thereto.

Some embodiments of the present invention may arise from the realization that a communication protocol can be established between two communication devices using TransferJet circuitry to provide a very high speed communication link for data in one direction between the devices and using NFC circuitry to provide a much lower speed communication link for control information in the opposite direction. Accordingly, in some embodiments, one of the communication devices includes a TransferJet transmitter circuit and a NFC receiver circuit, and the other communication device includes a TransferJet receiver circuit and a NFC transmitter circuit. Because the TransferJet transmitter/receiver circuitry with its much higher communication speed uses substantially more power than the NFC transmitter/receiver circuitry, substantial power savings may be obtained by communicating data in one direction using TransferJet protocol circuitry and communicating responsive control information in the opposite direction using NFC protocol circuitry.

As used herein, the term "TransferJet" refers to any communication circuit that at least substantially complies with one or more of the specifications promulgated by the TransferJet Consortium (i.e., available on the World Wide Web at "transferjet.org") and/or by its predecessors or successors. Also as used herein, the term "NFC" refers to any communication circuit that at least substantially complies with one or more of the specifications promulgated by the NFC Consortium (i.e., available on the World Wide Web at "nfc-forum.org") and/or by its predecessors or successors.

FIG. 1 is a block diagram of an exemplary pair of electronic wireless communication devices and methods of operating same according to various embodiments. Referring to FIG. 1, one of the communication devices is referred to as a data source device 100 because it may primarily function as a source of data that is communicated to the other device. The other communication device is referred to as a data sink device 150 because it may correspondingly primarily function to receive data from the data source device 100.

Exemplary types of data source devices may include, but are not limited to, broadcast television signal decoders, digital still cameras, digital video cameras, mobile phones, computers, mass data storage devices (e.g. portable hard disk/flash memory devices). Similarly, exemplary types of data sink devices may include, but are not limited to, televisions, video recorders, optical data storage disk devices (e.g., DVD, Blu-eray, HD DVD recorders), magnetic data storage disk devices (e.g., hard disk/flash memory devices), and/or computer printers/displays.

The data source device 100 includes a TransferJet transmitter (TX) circuit 102 and a NFC receiver (RX) circuit 104. In contrast, the data sink device 150 includes a TransferJet receiver circuit 152 and a NFC transmitter circuit 154. The TransferJet transmitter circuit 102 of the data source device 100 is configured to transmit a data block to the TransferJet receiver circuit 152 using a TransferJet protocol when the circuits 102 and 152 are proximately located to each other. For example, the TransferJet transmitter and receiver circuits 102 and 152 may be configured to communicate across an air interface of up to about 3 cm, although the invention is not limited thereto as other communication ranges can be obtained by, for example, adjusting the transmitter power level and/or the robustness of the data coding (e.g., error correction coding rate).

The TransferJet transmitter circuit 102 and the TransferJet receiver circuit 152 may communicate through corresponding proximately located antennas 108 and 158. Similarly, the NFC receiver circuit 104 and the NFC transmitter circuit 154 can communicate through corresponding proximately located antennas 110 and 160.

Although the TransferJet transmitter circuit 102 and the NFC receiver circuit 104 of the data source device 100 and the TransferJet receiver circuit 152 and the NFC transmitter circuit 154 of the data sink device 150 have been shown as utilizing separate antennas 108 and 110 and 158 and 160, respectively for ease of illustration and explanation, the data source device 100 and/or the data sink device 150 may combine their respective TransferJet and NFC antennas into a common antenna structure. For example, the NFC antennas use magnetic coupling at, for example, 13 MHz to communicate. In contrast, the TransferJet antennas use RF coupling at, for example, 4.5 GHz to communicate, and may be physically much smaller than the NFC antennas. However, in spite of these differences, a TransferJet antenna may be embedded within an NFC antenna structure, with the antennas each being configured to operate at significantly different frequencies and with different electromagnetic couplings.

The data sink device 150 can include a communication controller 164 that is configured to verify a data block from the data source device 100 that is received by the TransferJet receiver circuit 152 and to generate a communication control signal (e.g., an acknowledgment signal) that indicates the outcome of the verification. The NFC transmitter circuit 154 then transmits the communication control signal back to the data source device 100 using a NFC protocol. The NFC receiver circuit 104 of the data source device 100 is configured to receive the communication control signal from the data sink device 150 and to respond to the communication control signal by triggering the TransferJet transmitter circuit 102 to transmit another block of data, when available for transmission, to the data sink device 150. In some embodiments, the NFC receiver circuit 104 may wake-up (e.g., power-on) the TransferJet transmitter circuit 102 in response to receiving the communication control signal. In a similar manner, in preparation for receiving data from the data source device 100, the NFC transmitter circuit 154 may wake-up the TransferJet receiver circuit 152 of the data sink device 150.

The communication controller 164 may verify a received data block by performing an error detection code of the received data, such as by generating a checksum from the received data that is compared to a checksum value embedded within the received data block (e.g., within a header or tail of the packet). The communication controller 164 may be configured to determine a number of bit errors in the received data, and may perform an error correction code on the data to attempt to correct the errors. The communication control signal generated by the communication controller 164 may therefore provide a pass/fail indication or provide more detailed information as to whether the received data has been properly decoded without error and/or whether uncorrected errors remain after attempting error correction.

As shown in FIG. 1, the exemplary data source device 100 may not include a TransferJet receiver circuit and may further not included a NFC transmitter circuit. Accordingly, the TransferJet transmitter circuit 102 can be the only circuit in the data source device 100 that is capable of transmitting data via RF communication signals directly to the data sink device 150, and the NFC receiver circuit 104 can be the only circuit in the data source device 100 that is capable of receiving control information via RF control signals directly from the data sink device 150. Substantial power savings may be achieved by eliminating a TransferJet receiver circuit and a NFC transmitter circuit from the data source device 100, and the power settings may enable the data source device 102 to be powered by an inductive charging circuit 106.

The inductive charging circuit 106 can be configured to convert NFC signals from the NFC transmitter circuit 154 of the data sink device 150 into power, and to supply the power to at least the TransferJet transmitter circuit 102 and the NFC receiver circuit 104. The antenna 110 may be configured as a loop antenna that is tuned to the transmission frequency of the NFC transmitter circuit 154 so as to generate current from the incident NFC electromagnetic fields. The charging circuit 106 uses the current from the antenna 110 to charge a capacitor or other charge source device to accumulate power.

Accordingly, in some embodiments, the data sink device 150 can include a power source 162 (e.g., battery power source) that powers circuitry therein. In contrast, the data source device 100 can operate without its own power source by generating power through its inductive coupling to the electromagnetic fields transmitted by the NFC transmitter circuit 154 of the data sink device 150. However, in some other embodiments, the data source device 100 may also include a power source 112 (e.g., battery power source) that may replace the inductive charging circuit 106 or may supplement the power that is generated by the inductive charging circuit 106.

Figures 2, 3:
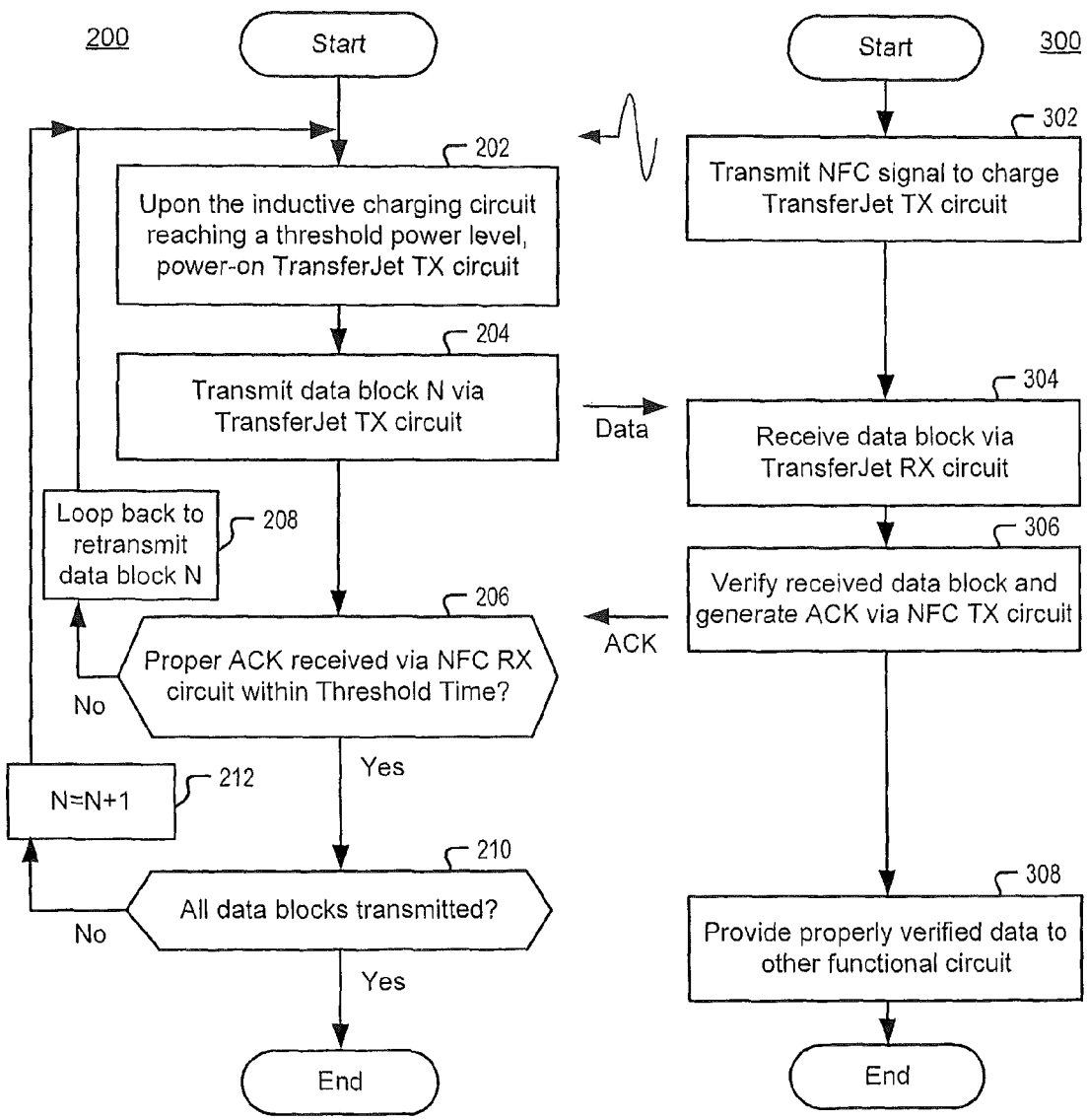
FIG. 2 is a flowchart of operations that may be performed by the data source device, such as the data source device of FIG. 1, according to various embodiments.
FIG. 3 is a flowchart of operations that may be performed by the data sink device, such as the data sink device of FIG. 1, according to various embodiments.

Further exemplary operation as the data source device 100 and the data sink device 150 now will be described with reference to FIGS. 2 and 3. FIG. 2 is a flowchart of operations 200 that may be performed by the data source device 100, and FIG. 3 is a flowchart of operations 300 that may be performed by the data sink device 150.

When the TransferJet transmitter circuit 102 is transmitting, it may consume power at a greater rate than what can be generated by the inductive charging circuit 102. Accordingly, when operating without a separate power source 112, the TransferJet transmitter circuit 102 may be configured to transmit data blocks in bursts with the inductive charging circuit 106 recharging therebetween. In some embodiments, the data blocks may each be the same size, while in some other embodiments the number of bits in the data blocks may vary from one burst to another in response to how much power can be supplied by the inductive charging circuit 106 during each separate transmission before falling below a level needed to operate the TransferJet transmitter circuit 102 and which triggers cessation of the burst transmission.

In some embodiments, to enable data transfer from the data source device 100 to the data sink device 150, the NFC transmitter circuit 154 of the data sink device 150 continuously transmits (block 302) a NFC signal to charge the inductive charging circuit 106 and, thereby, power the TransferJet transmitter circuit 102 of the data source device 100. When data resides in the data source device 100 that needs to be transmitted to the data sink device 150 and the inductive charging circuit 106 has accumulated at least a threshold power level, the TransferJet transmitter circuit 102 is powered-on (block 202) and a data block (N) is transmitted (block 204) via the TransferJet transmitter circuit 102 to the TransferJet receiver circuit 152 of the data sink device 150. As described above, the data block N may have a predefined length (number of data bits) or its length may vary depending on how much power can be presently supplied by the inductive charging circuit 106.

The TransferJet receiver circuit 152 of the data sink device 150 receives the data block (block 304), and the communication controller 164 verifies the received data block and generates an communication control signal. The NFC transmitter circuit 154 transmits (block 306) the communication control signal to the NFC receiver circuit 104 of the data source device 100.

The NFC receiver circuit 104 passes the communication control signal to the TransferJet transmitter circuit 102. When a proper communication control signal is not received by the TransferJet transmitter circuit 102 within a predefined threshold time (e.g., when the communication control signal indicates uncorrected errors in the received data or no communication control signal is received), the TransferJet transmitter circuit 102 may retransmit (block 208) at least a portion of the previous data block (N) or the entire data block (N) to the TransferJet receiver circuit 152 of the data sink device 150. In contrast, when a proper communication control signal is received within the threshold time and when further data is awaiting transmission to the data sink device 150 (block 210), the TransferJet transmitter circuit 102 transmits (block 212) the next data block (N+1) to the TransferJet receiver circuit 152 of the data sink device 150.

The data received by the data sink device 150 may be provided (block 308) to other functional circuitry 170 after it has been validated by the controller 164. The other functional circuitry 170 may include, but not be limited to, conventional circuitry provided in a television, a video recorder, an optical data storage disk device (e.g., DVD, Blueray, HD DVD recorder), a magnetic data storage disk device (e.g., hard disk/flash memory device), a computer printer/display, and/or other circuitry that can utilize and/or store data that is supplied by the data source device 100. Similarly, the data source device 100 can include other functional circuitry 120 that may include, but not be limited to, conventional circuitry provided in a broadcast television signal decoder, a digital still camera, a digital video camera, a mobile phone, a computer, a mass data storage device (e.g. portable hard disk/flash memory device), and/or other circuitry that generates and/or receives data that can be subsequently supplied to the data sink device 150.

Although FIG. 1 illustrates an exemplary pair of communication devices, it will be understood that the present invention is not limited to such configurations, but is intended to encompass any configuration capable of carrying out the operations described herein. For example, when the data sink device 150 can only communicate with the data source device 100 through the TransferJet receiver circuit 152 and the NFC transmitter circuit 154, due to the data source device 100 having short range communication capability through only the TransferJet transmitter circuit 102 and the NFC receiver circuit 104, the data sink device 150 may still further include a TransferJet transmitter circuit 153, a NFC receiver circuit 155, and/or other communication circuitry.

Moreover, the data source device 100 and/or the data sink device 150 may include long-range communication circuitry, such as wireless local area network (WLAN) communication circuitry (e.g. compliant with one or more of the IEEE 802.11 standards), Bluetooth communication circuitry, and/or cellular communication circuitry. The cellular communication circuitry may be configured to communicate using one or more cellular communication protocols such as, for example, Global Standard for Mobile (GSM) communication, General Packet Radio Service (GPRS), enhanced data rates for GSM evolution (EDGE), Integrated Digital Enhancement Network (iDEN), code division multiple access (CDMA), wideband-CDMA, CDMA2000, and/or Universal Mobile Telecommunications System (UMTS). As used herein, WLAN, Bluetooth, and cellular communication circuitry each have a much longer communication range and utilize different communication protocols from those of the TransferJet communication circuitry and the NFC communication circuitry.

The bit error rate in the transmitted data may substantially increase as the distance between the data source device 100 and the data sink device 150 increases, and the rate at which the inductive charging circuit 106 can recharge its power level between transmission bursts substantially decreases as the distance between the devices 100 and 150 increases. In some embodiments, the data source device 100 and/or the data sink device 150 may be configured to control a time delay between transmission bursts through the TransferJet communication link and/or to control the transfer rate of data bits in the TransferJet communication link to compensate for variation in quality of the TransferJet communication signals.

Figure 4:
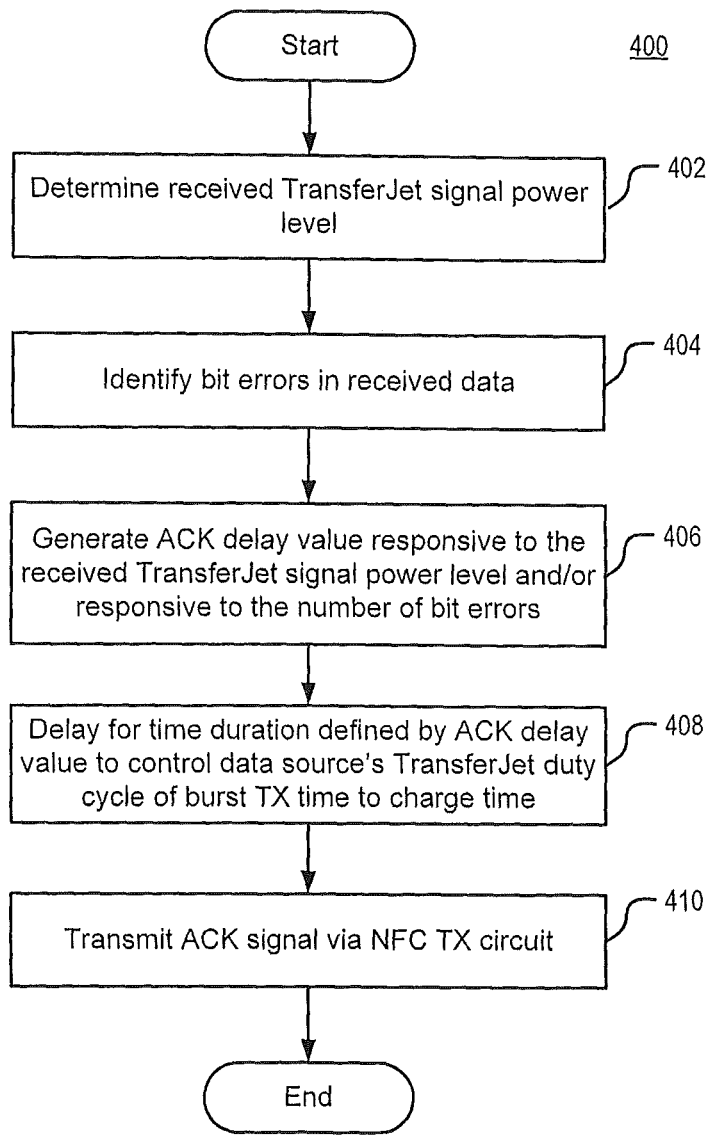
FIG. 4 is a flowchart of operations that may be performed by a communication controller in the data sink device, such as the data sink device of FIG. 1, according to various embodiments.

FIG. 4 is a flowchart of operations 400 that may be performed by the communication controller 164 in the data sink device 150 to control the time delay between transmission bursts in response to the communication control signal generated by the communication controller 160 of the data sink device 150. Referring to FIG. 4, the communication controller 164 may determine (block 402) the signal power level of the data block received by the TransferJet receiver circuit 152. The communication controller 164 may identify bit errors in the received data (block 404), and may further determine whether the number of bit errors exceeds a threshold that can be corrected by the error correction coding of the data block. The communication controller 164 generates (block 406) an communication control delay value in response to the received signal power level and/or in response to the number of bit errors. The communication controller 164 delays (block 408) for a time duration that is based on communication control delay value, and then transmits (block 410) the communication control signal via the NFC transmitter circuit 154 to the data source device 100. Accordingly, the communication controller 164 can regulate a time delay between TransferJet burst transmissions in response to the received signal strength and/or the determined that bit error rate, which can thereby control the amount of power accumulated by the inductive charging circuit 160 between transmission bursts. A longer delay may also result in a larger amount of power accumulated in the inductive charging circuit 160 which may be used to increase the TX power level of the TransferJET receiver 162. This may compensate for the increased propagation loss between transmitter 102 and receiver 152.

Thus, for example, the communication controller 164 may respond to failure of the data verification by increasing the communication control delay time to delay an upcoming transmission of a data from the data source device 100 and, thereby, to cause the inductive charging circuit 106 to accumulate power over a greater time between data block transmissions.

Figure 5:
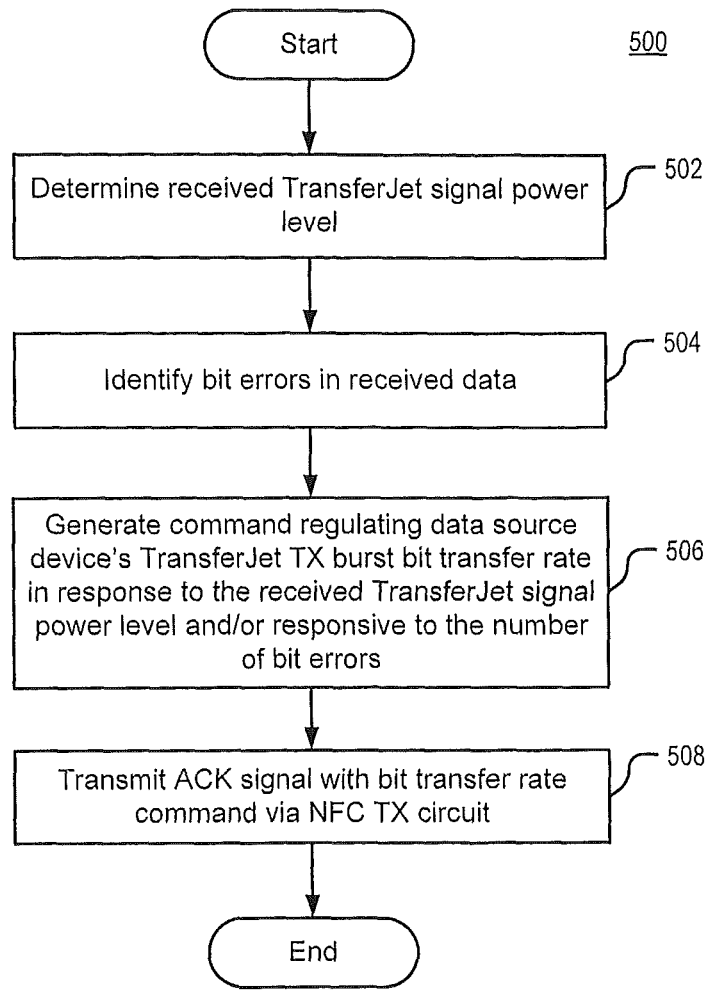
FIG. 5 is a flowchart of operations that may be performed by a communication controller in the data sink device, such as the data sink device of FIG. 1, according to various embodiments.

FIG. 5 is a flowchart of operations 500 that may be performed by the communication controller 164 in the data sink device 150 to control the TransferJet bit transfer rate from the TransferJet transmitter circuit 102 of the data source device 100. Referring to FIG. 5, the communication controller 164 may determine (block 502) the signal power level of the data block received by the TransferJet receiver circuit 152. The communication controller 164 may identify bit errors in the received data (block 504), and may further determine whether the number of bit errors exceeds a threshold that can be corrected by the error correction coding of the data block. The communication controller 164 generates (block 506) a command that regulates the bit transfer rate from the TransferJet transmitter circuit 102 in response to the received signal power level and/or in response to the number of bit errors. The communication controller 164 transmits (block 508) the command, which may be transmitted with the communication control signal, via the NFC transmitter circuit 154 to the data source device 100. Accordingly, the communication controller 164 can regulate a TransferJet bit transfer rate by the TransferJet transmitter circuit 102 (e.g., within block 204 of FIG. 2) in response to the received signal strength and/or the determined bit error rate.

Thus, for example, when a received signal power level falls below a threshold level, the communication controller 164 can transmit a command to the data source device 100 that causes the TransferJet transmitter circuit 102 to decrease its data transfer rate, increase its transmit power, and/or to increase a time delay between TransferJet burst transmissions to cause the inductive charging circuit 160 to accumulate power over a greater time between transmission bursts.

Figure 6:
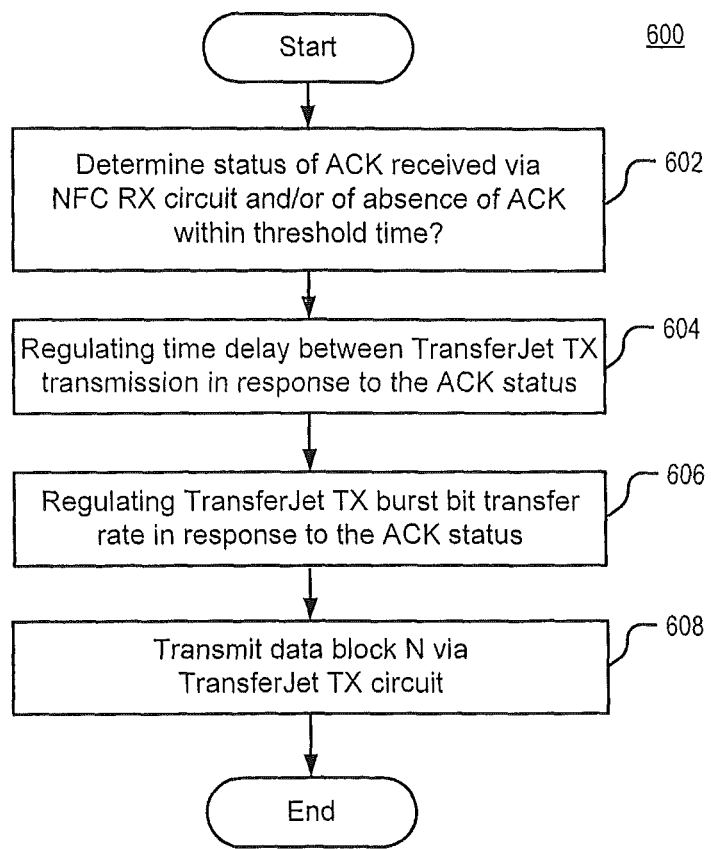
FIG. 6 is a flowchart of operations that may be performed by a data source device, such as the data source device of FIG. 1, according to various embodiments.

FIG. 6 is a flowchart of operations 600 that may be performed by a data source device 100 to control the delay between TransferJet burst transmissions and/or the TransferJet bit transfer rate. Referring to FIG. 6, the TransferJet transmitter circuit 102 can determine (block 602) the status of the communication controlcommunication control signal received via the NFC receiver circuit 104 and/or can detect the absence of the communication control signal within a threshold time. The TransferJet transmitter circuit 102 may regulate (block 604) a time delay between TransferJet burst transmissions in response to the status of the communication control signal and/or absence of the communication control signal. For example, the TransferJet transmitter circuit 102 may respond to a failed communication control signal by increasing the time between TransferJet burst transmissions to cause the inductive charging circuit 106 to accumulate power over a greater time between the transmissions.

The TransferJet transmitter circuit 102 may regulate (block 606) a TransferJet bit transfer rate in response to the status of the communication control signal and/or to absence of the communication control signal. For example, the TransferJet transmitter circuit 102 may decrease a transfer rate of data bits in an upcoming transmission burst in response to the communication control signal indicating that the previously transmitted data block was not properly received by the data sink device 150 and/or in response to absence of the communication control signal within a threshold time of a previous burst transmission. Accordingly, the effects of distance on the received TransferJet signal and/or the effects of electromagnetic interference on the received TransferJet signal may be at least partially compensated for by decreasing the transfer rate of the data bits. As used herein, controlling the TransferJet transfer rate may correspond to controlling an error correction coding rate (e.g., control amount of error correction coding per data block), to control a bit clocking rate in the transmitted data, and/or to increase the transmit power level.

The TransferJet transmitter circuit 102 can then transmit (block 608) a next data block (N) after expiration of the controlled delay time between burst transmissions and/or can transmit the next data block at the defined bit transfer rate.

In the exemplary embodiment of FIG. 1, the flow of NFC power has been described in the context of power flowing from the data sink device 150 to the data source device 100 in order to, provide power to, for example, the NFC receiver circuit 104 and the TransferJet transmitter circuit 102. However, the invention is not limited thereto. Indeed, in some other embodiments, NFC power may flow from the data source device 100 to the data sink device 150. Accordingly, the data sink device 150 may include an inductive charging circuit which may operate in a similar manner to that described above for inductive charging circuit 106. The data sink device 150 may communicate a ready signal as the communication control signal through the NFC transmitter circuit 154 to the data source device 100 to indicate when it has accumulated sufficient power to be able to power the TransferJet receiver circuit 152 for a sufficient length of time to receive a data block from the data source device 100. The data source device 100 may therefore respond to the ready signal by triggering the TransferJet transmitter circuit 102 to transmit the data block the data sink device 150. In addition, the ready signal may include an indication of the length of data block or amount of data the data sink 150 that it is able receive through the TransferJET receiver 152 taking into consideration the accumulated power.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. An electronic communication device comprising:
   a RF wireless transmitter circuit that is configured to transmit a block of data to another communication device via RF signals transmitted at a first rate;
   a magnetically coupled receiver circuit that is configured to receive a communication control signal from the other communication device via magnetic coupling thereto at a second rate which is less than the first rate, and is configured to respond to the communication control signal by selectively triggering the RF wireless transmitter circuit to transmit another block of data when available for transmission; and
   an inductive charging circuit that is configured to convert magnetic signals received from the other communication device into power, and to supply the power to the RF wireless transmitter circuit,
   wherein the RF wireless transmitter circuit is further configured to transmit data blocks in RF bursts.

2. The electronic communication device of claim 1, wherein:
   the RF wireless transmitter circuit consumes power at a greater rate when transmitting than what can be generated by the charging circuit from the magnetic signals, and
   a number of data bits in each data block varies in response to how much power is supplied by the charging circuit before falling below a threshold level needed to operate the RF wireless transmitter circuit.

3. The electronic communication device of claim 1, wherein:
   the RF wireless transmitter circuit comprises a TransferJet transmitter circuit; and
   the magnetically coupled receiver circuit comprises a Near Field Communication (NFC) receiver circuit.

4. The electronic communication device of claim 3, wherein the NFC receiver circuit is the only circuit in the electronic communication device that is capable of receiving communication signals through magnetic coupling from the other communication device, and the TransferJet transmitter circuit is the only circuit in the electronic communication device that is capable of transmitting RF communication signals directly to the other communication device.

5. The electronic communication device of claim 1, wherein:
   the RF wireless transmitter circuit consumes power at a greater rate when transmitting than what can be generated by the charging circuit from the magnetic signals; and
   the RF wireless transmitter circuit is further configured to increase a time delay between transmission bursts in response to the communication control signal, which is received via magnetic coupling through the magnetically coupled receiver circuit, indicating that the previously transmitted block of data was not properly received by the other communication device in order to cause the charging circuit to accumulate power over a longer time between burst transmissions.

6. The electronic communication device of claim 1, wherein:
   the RF wireless transmitter circuit consumes power at a greater rate when transmitting than what can be generated by the charging circuit from the magnetic signals, and
   the RF wireless transmitter circuit is further configured to decrease a transfer rate of data bits in an upcoming transmission RF burst in response to the communication control signal, which is received via the magnetically coupled receiver circuit, indicating that the previously transmitted block of data was not properly received by the other communication device.

7. The electronic communication device of claim 1, wherein:
   the RF wireless transmitter circuit is further configured to retransmit at least a portion of a previously transmitted block of data in response to the communication control signal, which is received via the magnetically coupled receiver circuit, indicating that the previously transmitted block of data was not properly received by the other communication device; and
   the RF wireless transmitter circuit is further configured to transmit a next block of data in response to the communication control signal indicating that the previously transmitted block of data was properly received by the other communication device.

8. The electronic communication device of claim 7, wherein the NFC transmitter circuit is the only circuit in the electronic communication device that is capable of transmitting communication signals through magnetic coupling to the other communication device, and the TransferJet receiver circuit is the only circuit in the electronic communication device that is capable of receiving RF communication signals directly from the other communication device.

9. An electronic communication device comprising:
   a RF wireless receiver circuit that is configured to receive a block of data from another communication device via RF signals transmitted at a first rate;
   a communication controller that is configured to verify the received data block and to generate a control signal that indicates the outcome of the verification; and
   a magnetically coupled transmitter circuit that is configured to transmit the communication control signal to the other communication device via magnetic coupling thereto at a second rate which is less than the first rate.

10. The electronic communication device of claim 9, wherein:
    the communication controller is further configured to control length of a delay time between receipt of the data block and transmission of the corresponding communication control signal to the other communication device in response to the outcome of the verification; and
    the communication controller is further configured to respond to a failed verification outcome by increasing the delay time to delay an upcoming transmission of a data block from the other communication device to allow an inductive charging circuit in the other communication device to accumulate more stored power from magnetic signals from the magnetically coupled transmitter circuit.

11. The electronic communication device of claim 9, wherein:
    the RF wireless receiver circuit comprises a TransferJet receiver circuit; and
    the magnetically coupled transmitter circuit comprises a Near Field Communication (NFC) transmitter circuit.

12. The electronic communication device of claim 9, wherein:
    the communication controller is further configured to control length of a delay time between receipt of the data block and transmission of the corresponding communication control signal to the other communication device in response to the outcome of the verification, and the communication controller is further configured to determine a number of bit errors in the received data block and to control the delay time in response to the number of bit errors.

13. The electronic communication device of claim 9, wherein:
the communication controller is further configured to respond to the outcome of the verification by transmitting via the magnetically coupled transmitter circuit a command that regulates a transfer rate of data bits in an upcoming transmission of a data block from the other communication device.

14. The electronic communication device of claim 13, wherein:
the communication controller is further configured to determine a number of bit errors in the received data block, and transmit the command via the magnetically coupled transmitter circuit to regulate the transfer rate of data bits in the upcoming data block transmission from the other communication device in response to the determined number of bit errors.

15. An electronic communication device comprising:
a RF wireless receiver circuit that is configured to receive a block of data from another communication device via RF signals transmitted at a first rate;
a communication controller that is configured to verify the received data block and to generate a control signal that indicates the outcome of the verification; and
a magnetically coupled transmitter circuit that is configured to transmit the communication control signal to the other communication device via magnetic coupling thereto at a second rate which is less than the first rate, wherein the communication controller is further configured to determine a signal power level of the data block received by the RF wireless receiver circuit, and to transmit via the magnetically coupled transmitter circuit a command that regulates a transfer rate of data bits in an upcoming data block transmission from the other communication device in response to the signal power level.

16. An electronic communication device comprising:
a RF wireless receiver circuit that is configured to receive a block of data from another communication device via RF signals transmitted at a first rate;
a communication controller that is configured to verify the received data block and to generate a control signal that indicates the outcome of the verification; and
a magnetically coupled transmitter circuit that is configured to transmit the communication control signal to the other communication device via magnetic coupling thereto at a second rate which is less than the first rate, wherein the communication controller is further configured to determine a signal power level of the data block received by the RF wireless receiver circuit, and to control length of a delay time between receipt of the data block and transmission of the corresponding communication control signal to the other communication device in response to the outcome of the determined signal power level to thereby control an amount of power that is stored between transmissions by an inductive charging circuit in the other communication device from magnetic signals that are transmitted by the magnetically coupled transmitter circuit.

* * * * *